United States Patent
Jaber (10) Patent No.: US 9,805,360 B1
(45) Date of Patent: Oct. 31, 2017

(54) LOCATION BASED DEVICE FLAGGING AND INTERFACE

(71) Applicant: Philz Coffee, Inc., San Francisco, CA (US)

(72) Inventor: Jacob Jaber, San Francisco, CA (US)

(73) Assignee: Philz Coffee, Inc., San Francisco, CA (US)

( * ) Notice: Subject to any disclaimer, the term of this patent is extended or adjusted under 35 U.S.C. 154(b) by 0 days.

(21) Appl. No.: 15/604,337

(22) Filed: May 24, 2017

Related U.S. Application Data (60) Provisional application No. 62/473,077, filed on Mar. 17, 2017.

(51) Int. Cl.
| | |
|---|---|
| *G06Q 20/32* | (2012.01) |
| *H04W 4/02* | (2009.01) |
| *H04W 4/00* | (2009.01) |
| *H04L 29/08* | (2006.01) |

(52) U.S. Cl.
CPC .......... *G06Q 20/3224* (2013.01); *H04W 4/02* (2013.01); *H04L 67/02* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 2015/0170132 A1* | 6/2015 | Patel | G06Q 20/40 705/44 |
| 2015/0178702 A1* | 6/2015 | Patel | G06Q 20/18 705/21 |
| 2016/0055693 A1* | 2/2016 | Somani | G07B 15/02 340/5.61 |
| 2017/0161706 A1* | 6/2017 | Patel | G06Q 20/327 |
| 2017/0221117 A1* | 8/2017 | Bollman, IV | G06Q 30/0611 705/26.4 |

* cited by examiner

Primary Examiner — Robert R Niquette
Assistant Examiner — Joseph W King
(74) *Attorney, Agent, or Firm* — Perkins Coie LLP (57) ABSTRACT

This disclosure describes a system for automatically transitioning items from a materials handling facility without delaying a user as they exit the materials handling facility. For example, while a user is located in a materials handling facility, the user may pick one or more items. The items are identified and automatically associated with the user at or near the time of the item pick. When the users enters and/or passes through a transition area, the picked items are automatically transitioned to the user without affirmative input from or delay to the user.

19 Claims, 10 Drawing Sheets

LOCATION BASED DEVICE FLAGGING AND INTERFACE

PRIORITY CLAIM

This application claims priority to U.S. Provisional Patent Application No. 62/473,077, entitled "LOCATION BASED DEVICE FLAGGING AND INTERFACE", filed on Mar. 17, 2017 which is incorporated herein by reference in its entirety.

TECHNICAL FIELD

This disclosure relates to location-based mobile device applications. The disclosure more particularly relates to applications that activate in response to maintained presence in a given location.

BACKGROUND

Some smartphone applications make use of a process commonly known as "checking-in" whereby a user indicates via their phone that they are at a given location. Often there is either a benefit for the user tied to the check-ins. In a similar type of application, a smartphone application identifies where a user is without further user input. The application provides information about the location or solicits a review of the location.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Disclosed herein is an application that enables an "honor-based" system of purchasing particular items from a given location or store through a user's smart phone. This removes the traditional human interaction of approaching a register to pay for goods. Rather the user simply receives their goods and then separately a user device processes a payment. This is "honor-based" in the sense that the reception of goods or items is de-coupled from the payment processing.

In an example process of use, a user enters a store and their mobile device and/or a store based system detects that the mobile device has entered the store. A prompt is sent to the user in order to ask the user which items they intend to purchase. The user provides input to the client application through their device of the items they are purchasing, and a payment is processed through a user account. Decoupled from this experience, the user has simultaneously ordered and picked up their items.

Some additional features include the ability to maintain a social friends list in the client application. The friends list enables a user to select items to purchase for other users. In some embodiments, the history of third party purchases is monitored, and prompts for socially "returning the favor" are provided. Additionally, some embodiments of the system learn commonly selected items for a given user in order to prepare a suggestion page that streamlines the experience further.

Figure 1:
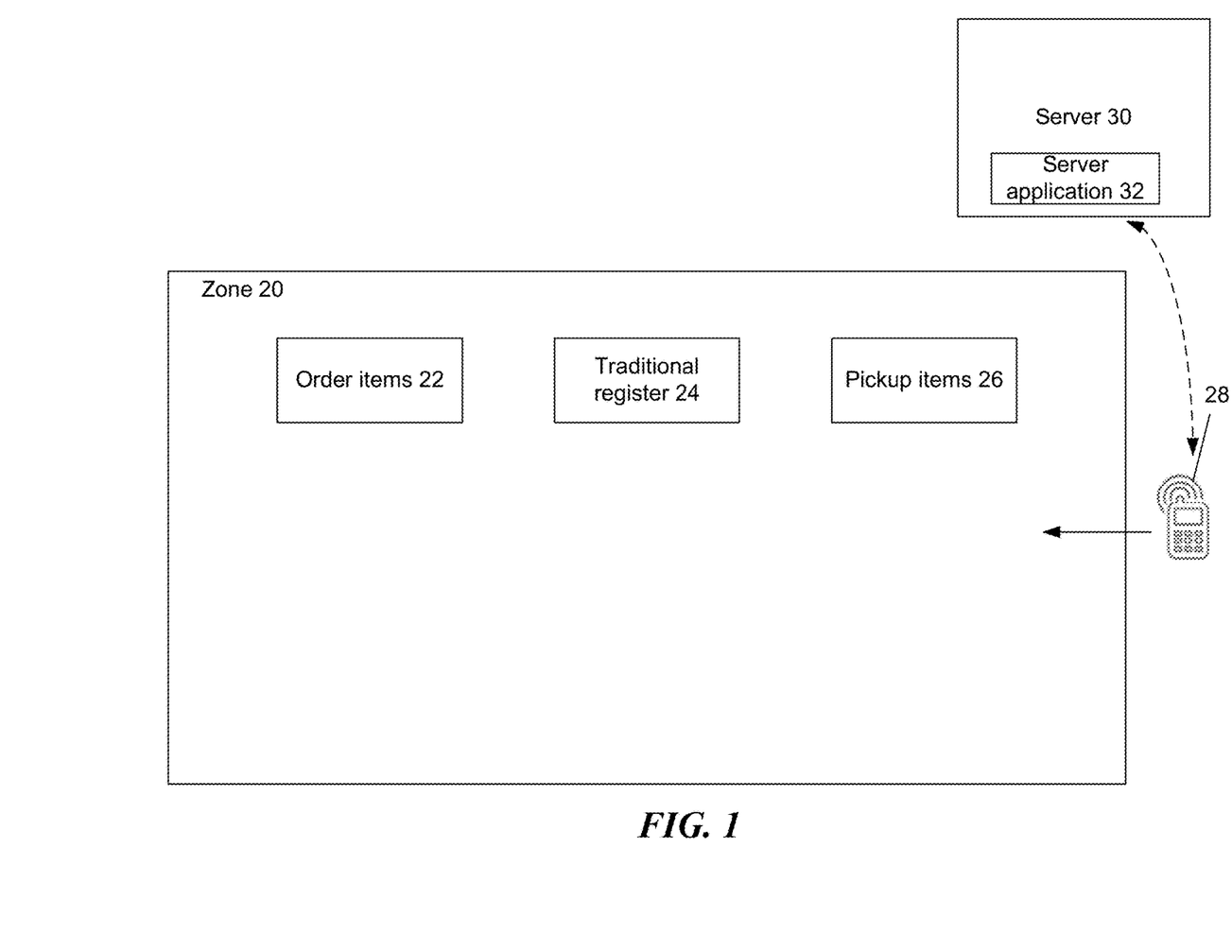
FIG. 1 is a block diagram illustrating a location-aware device in a materials handling facility, according to some implementations.

FIG. 1 is a block diagram illustrating a location-aware device in a materials handling facility, according to some implementations. The materials handling facility here is a particular zone 20. The particular zone 20 may be any form of commercial establishment open to the public. An example of the particular zone 20 is a coffee shop.

Traditionally, a coffee shop has some combination of an ordering counter 22, a register 24 and a pick up counter 26. In some locations these counters may be combined. In normal practice a user approaches the order counter 22, orders, walks to the register 24, pays, and then waits by the pickup counter 26 to receive their order. Disclosed herein is a replacement procedure. First, a user, including a mobile device 28, enters the particular zone 20. The user orders their items from the order counter 22. The user pays for items the user identifies on their mobile device 28. The user picks up items from the pickup counter 26, and then leaves freely.

In order to enable this procedure, there is a detection mechanism for the location of the mobile device 28. In each case, the mobile device 28 communicates with a web server 30. The web server 30 uses server application software 32 in order to correspond with client software executing on the mobile device 28. Further, a user of the mobile device 28 generates a user account on the web server 30 via the client application software. The user account includes details that optionally include a user name, payment card (or Internet payment processor e.g., PayPal®, Venmo®, Bitcoin®, other suitable known services), billing address, purchase history, and social networking data.

As a result that a user is detected (via their respective mobile device 28) entering the particular zone 20, the user may be penalized for leaving the zone without purchasing anything. When the mobile device 28 leaves the particular zone 20, where a payment is not processed, the system may automatically charge a predetermined amount. However, the system also prevents the case of false positives—were a user to run in and out of the particular zone 20 quickly—and does not automatically charge in this instances. Further where a third party processes a payment on behalf of the first user, there is also no automatic charge as the mobile device 28 leaves the particular zone 20.

This system also provides a secondary source of inventory management for the commercial establishment at the particular zone 20. Where the user indicates a given purchase via the mobile device 28, the purchase is transmitted to the web server 30. The web server 30 retains analytics thereto. In some instances, a user may remove an item from an inventory location within the materials handling facility. Upon detecting the removal, the removed item is identified and included on an item identifier list associated with the user that removed the item.

Because the items have already been identified, the transition may be done automatically without any affirmative input from the user or delay to the user. For example, if the user, is exiting the materials handling facility with the items, the user will pass through a transition area (such as a loading door, a door exiting the materials handling facility, etc.) as they exit the materials handling facility. When the user enters the items into the mobile device 28, the items identified on the item identifier list are automatically transitioned from the materials handling facility to the user.

Figure 2:
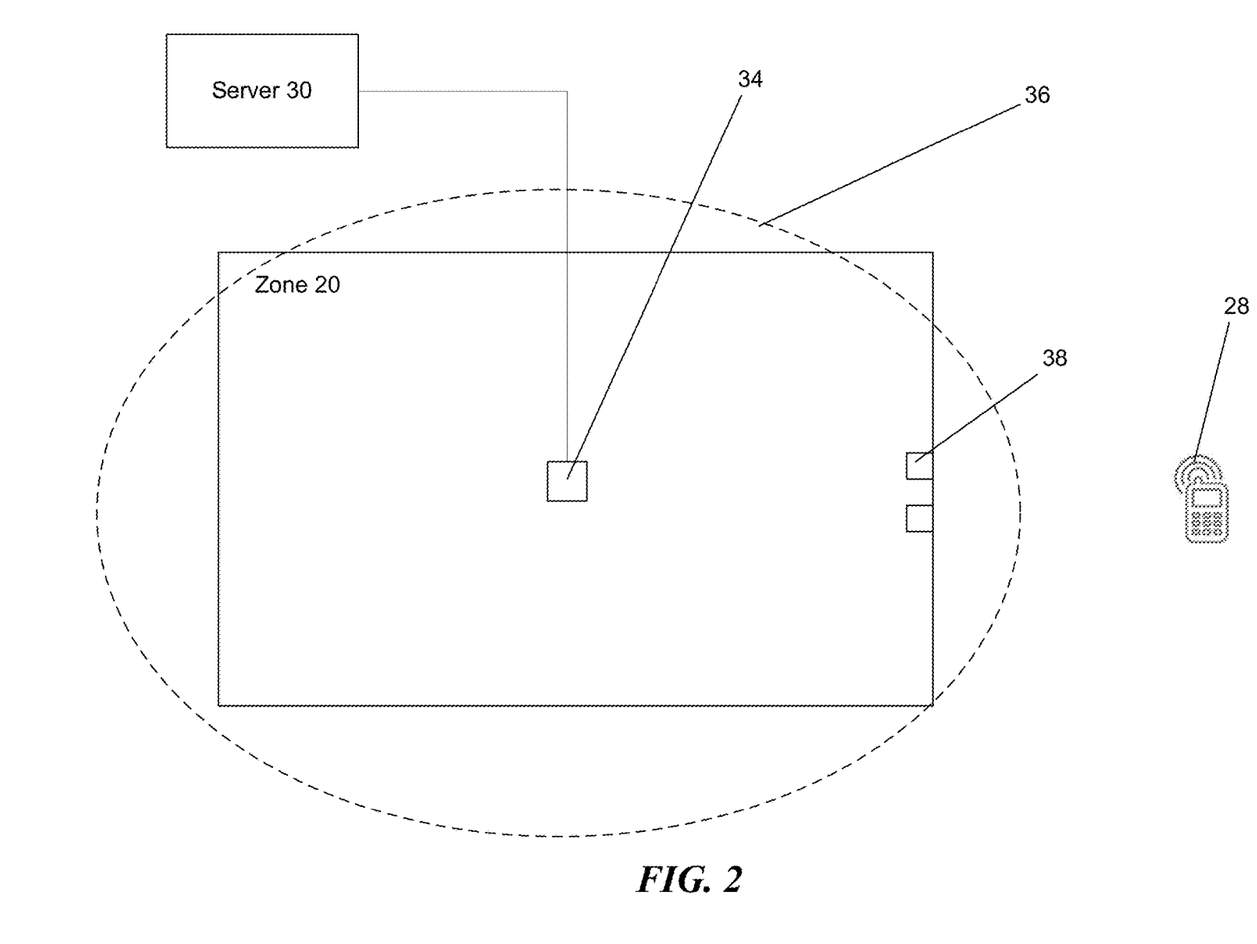
FIG. 2 is a block diagram illustrating additional details of a location-aware device in a materials handling facility, according to some implementations.

FIG. 2 is a block diagram illustrating additional details of a location-aware device in a materials handling facility, according to some implementations. Illustrated with the particular zone 20 and the mobile device 28 are a number of ways to detect the presence of the mobile device 28 within the particular zone 20.

In some embodiments, the particular zone 20 includes a wireless access point ("AP") 34. The AP 34 broadcasts a wireless signal 36. Examples of the wireless signal 36 include WiFi or a machine-to-machine protocol such as Bluetooth. The AP 34 connects through the Internet to the server 30. The server 30 coordinates functionality of the application software—both client and server. Upon entering the broadcast range of the AP 34, the mobile device 28 connects to the AP 34 establishing a communicative connection, thereby alerting the server 30 to the location of the mobile device 28.

In some embodiments, the client software of the mobile device 28 includes network identification information for the wireless signal 36. Accordingly, even where the user has not connected to the network supported by the AP 34, the mobile device 28 is still configured to connect to that network automatically. This is made possible because the client software on the mobile device 28 communicates with the server application software 32 on the server 30. In this manner, where the commercial establishment residing in the particular zone 20 is a chain establishment, users may visit any of the chain locations at a number of particular zones 20 and automatically connect to the wireless signal 36 available locally. As a secondary benefit to providing location information of the mobile device 28 to the server 30, the AP 34 provides Internet access to the mobile device 28.

In some embodiments, the client software on the mobile device 28 coordinates with an on-board location-aware sensor. Such sensors include GPS, WiFi mapping, cellular triangulation, or other suitable known techniques of identifying the location of a mobile device. The mobile device 28 then informs the server 30 of its location. Using the location data, the server 30 compares to location data, or bounds of the particular zone 20 (e.g., a geo-fence). In this manner the server 30 detects the location of the mobile device 28 with respect to the particular zone 20. Data received from a location sensor over time generates a vector upon which a mobile device 28 travels. Where a detected location falls at a dramatically different location than the vector, this positional data may be ignored.

Similarly, in some embodiments, a mobile device 28 may not rely on a sensor to provide a location. A user may "check-in" to the particular zone 20 using their mobile device 28. In this manner, user input indicates to the server 30 that the mobile device 28 is inside the particular zone 20.

In some embodiments, the particular zone 20 includes door gates 38. Door gates 38 are positioned at all entrances and exits of the particular zone 20. The door gates 38 communicate with the mobile device 28 and detect the presence of thereof. The door gates 38 may communicate with a number of protocols and in a number of manners. Example protocols include near field communication ("NFC"), Bluetooth, Bluetooth Low Energy (BLE), and radio frequency identifier ("RFID").

There are also a number of ways to detect the difference between a mobile device 28 coming and one going. For example, there may be two door gates 38, each associated with either coming or going. When entering the user bring their mobile device 28 close to an entering door gate, and upon leaving the user brings the mobile device 28 close to the leaving door gate.

Another method to differentiate between "in" and "out" detections is to generate a flag within the door gates 38 pertaining to a particular mobile device 28. Where a given device has not been detected for a predetermined time period of time, suddenly detecting that device is interpreted by the door gate 38 as an entrance. Similarly, if the particular mobile device 28 has a status of "entered" the next detection must be an exit.

In some implementations, data from other input devices may be used to assist in determining the identity of items picked and/or placed in inventory locations. For example, if it is determined that an item is placed into an inventory location, in addition to image analysis, a weight of the item may be determined based on data received from a scale, pressure sensor, load cell, etc., located at the inventory location. The image analysis may be able to reduce the list of potentially matching items down to a small list. The weight of the placed item may be compared to a stored weight for each of the potentially matching items to identify the item that was actually placed in the inventory location. By combining multiple inputs, a higher confidence score can be generated increasing the probability that the identified item matches the item actually picked from the inventory location and/or placed at the inventory location. In another example, one or more RFID readers may collect or detect an RFID tag identifier associated with a RFID tag included in the item.

An RFID tag generally refers to a device with an antenna or resonator that can produce a wireless signal when activated or powered. The wireless signal produced by the RFID tag is typically low power, and intended for transmission over short distances. The RFID tag may be formed of any material and may be flexible or rigid. In some implementations, the RFID tag may include an adhesive on a portion of the exterior of an RFID tag surface to enable attachment of the tag to an item, such as an inventory item. For example, an RFID tag may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

A final example includes multiple wireless communicators exist in each door gate 38. The multiple communicators use signal strength measurements (e.g., RSSI) in order to determine the position of the mobile device 28. With the position of the mobile device 28 over a period of time, the door gate 38 is enabled to generate a vector for the mobile device 28. The vector either is directed in or out of the particular zone 20.

Any of the above methods may be used to transition a mobile device 28 into the particular zone 20. The methods may be used in singular or in combination. Combining the methods increases accuracy of detection. Reducing false positives is important to user experience.

Figure 3:
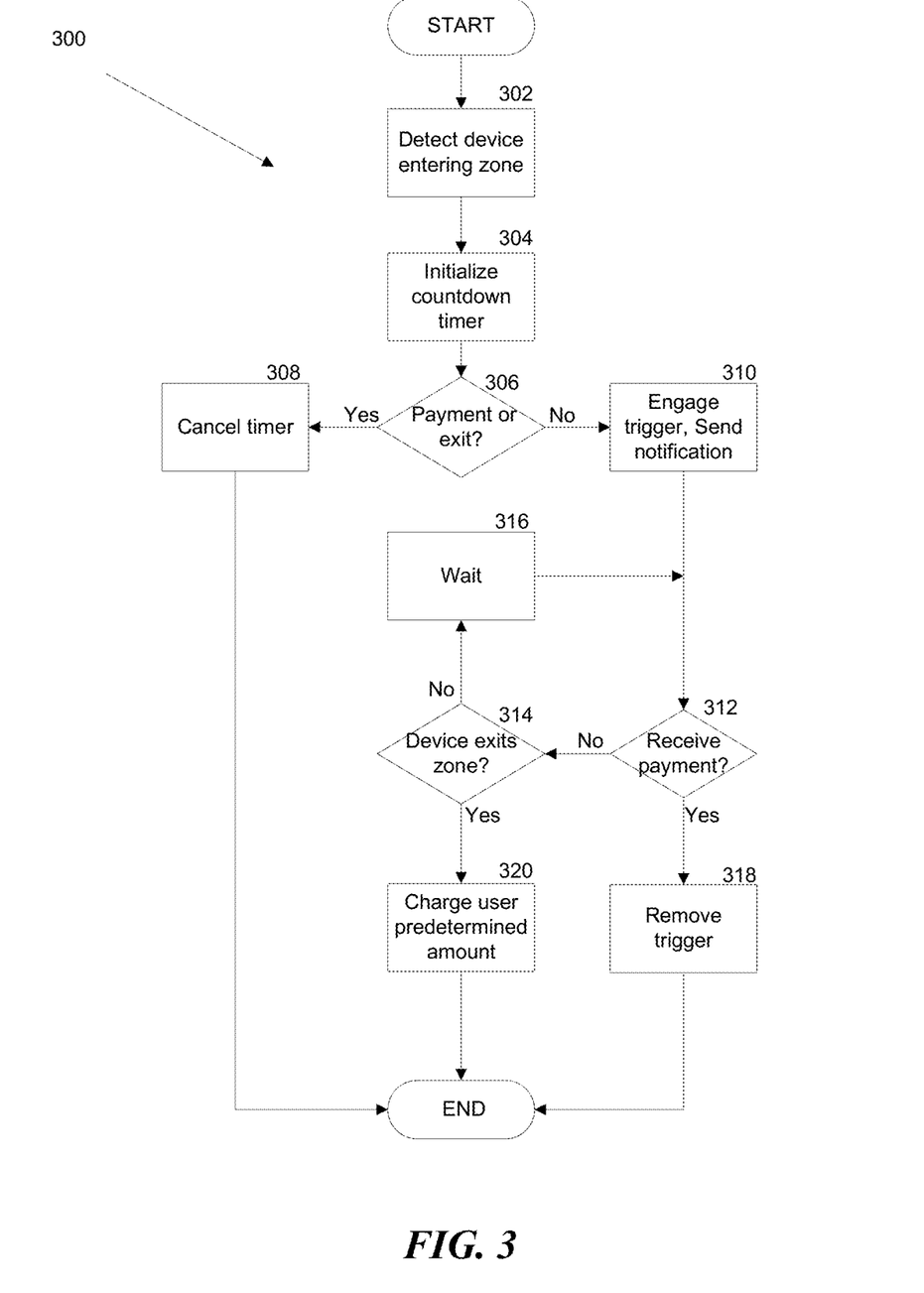
FIG. 3 is a flow chart illustrating location based device flagging.

FIG. 3 is a flow chart illustrating location based device flagging. In step 302, the server detects the mobile device entering the zone. This step is performed by any of the methods discussed herein in singular or combination. In step 304, the application software (either client or server) initializes a countdown timer. This countdown timer exists for the purpose of establishing a "mistake entrance" condition. Where a user did not intend to enter the zone, the mobile device falsely reported a location within the zone, or the user merely doubled back for whatever reason it is beneficial to not force users to incur penalties that may occur for entering the zone and not interacting with the client software.

In step 306, The system determines whether or not the mobile device has left the zone or a payment has been processed on the particular device's behalf. The timer is configured to have a duration for identifying "serious" customers. What qualifies as a serious customer for a given commercial establishment varies based on the establishment. In the previously used example of a coffee shop, 60-90 seconds is suitable, though other examples may be used and may depend on a number of factors. Such factors include an average wait time for a customer to be served at that given commercial establishment. Even across a chain establishment, depending on location, and time of day, wait times prior to service vary. In this manner, the length of the timer may be adjusted based upon day, time or day, historical average wait time, or particular location (i.e. downtown, neighborhood, etc.).

Where the mobile device leaves prior to the expiration of the timer, the timer is canceled (step 308), and no further effect occurs. Where a payment (of any amount with any selected items) is processed prior to the expiration of the timer, the timer is canceled (step 308), and no further effect occurs. A payment may be processed on behalf of the mobile device either through the mobile device by the user, or by a third party in a payment that includes a reference to the mobile device. Such a reference can be through the use of a friends list, a device ID, a user name, an account name, or other suitable means known in the art to identify the mobile device with the application server. Payments may be processed at any time regardless of device location and/or trigger status. Payments are made to the server, which is associated with the commercial establishment located in the zone.

In step 310, where the above conditions are not met, and the timer expires, the server engages a trigger for the particular mobile device. The trigger may also be referred to as a device flag. The trigger identifies the mobile device as active to the server. Along with the trigger, the server delivers a notification to the mobile device. The notification may be sent via SMS, MMS, or through the client application. The notification invites the user to process a payment.

Steps 312-316 are an attendance loop. As the user remains in the zone without processing a payment, these steps will continue to loop. First, in step 312, there is a check for whether or not a payment has been processed on behalf of the mobile device (either first person or third person payment). In step 314, where no payment processed, the server checks if the mobile device is still within the zone. While the device remains in the zone, in step 316, the server loops back to step 213. The loop is exited on either the processing of a payment or the mobile device exiting the zone.

In step 318, where a payment is processed on behalf of the mobile device, the trigger is removed in the server for the mobile device. In this instance, the user and the mobile device continues however they please. The system no longer need to detect whether the mobile device remains within the zone. However, after a predetermined amount of time, the method may repeat, or upon detection of leaving and returning.

In step 320, where the mobile device leaves the zone without processing a payment, and with a trigger a predetermined amount is charged to the user. This amount may be zero. In some embodiments the predetermined amount is based off a prior purchase history. For example, if a user routinely processes a payment for 1 item, the predetermined amount may be the price of that one item. Alternatively, the predetermined amount may be based upon the average amount each customer spends in a given visit. Upon charging the predetermined amount, the server removes the trigger.

Figure 4:
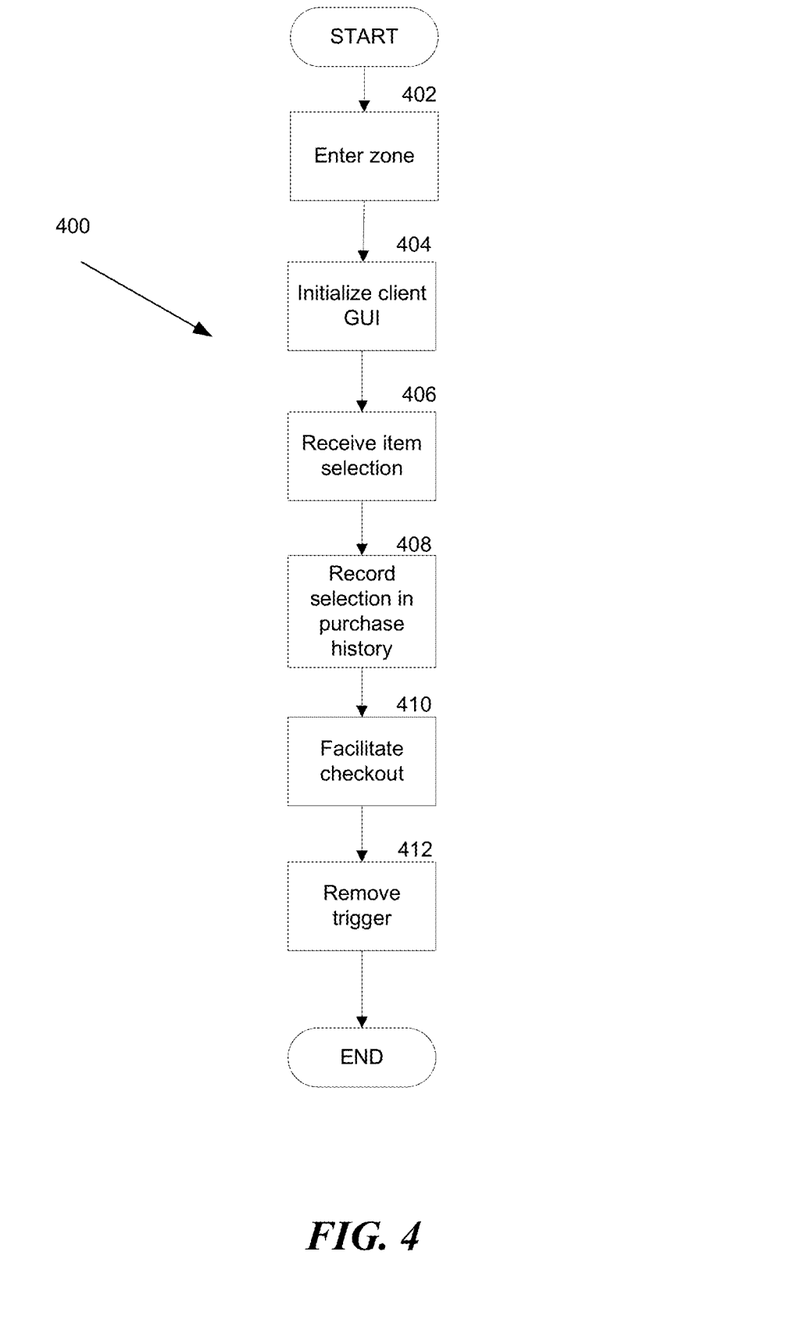
FIG. 4 is a flow chart illustrating a user action flow to select items.

FIG. 4 is a flow chart illustrating a user action flow to select items. This method is directed to processing a first person payment and the GUI involved. In step 402, the mobile device is detected inside the zone. In step 404, the client application initializes a GUI. Step 404 occurs at any time (even when a mobile device is not inside the zone), but the client software prompts this step in conjunction with step 310 of FIG. 3.

In step 406, the GUI of the client application receives item selections from the user. The items include items available for purchase at the commercial establishment within the zone. In step 408, the user item selections are recorded by application software (either client or server). The recorded items are used later to provide a recommended items list for further visits to the zone.

In step 410, the client and server applications facilitate the processing of the payment for the selected items. In step 412, the server removes the trigger associated with the mobile device.

Figure 5:
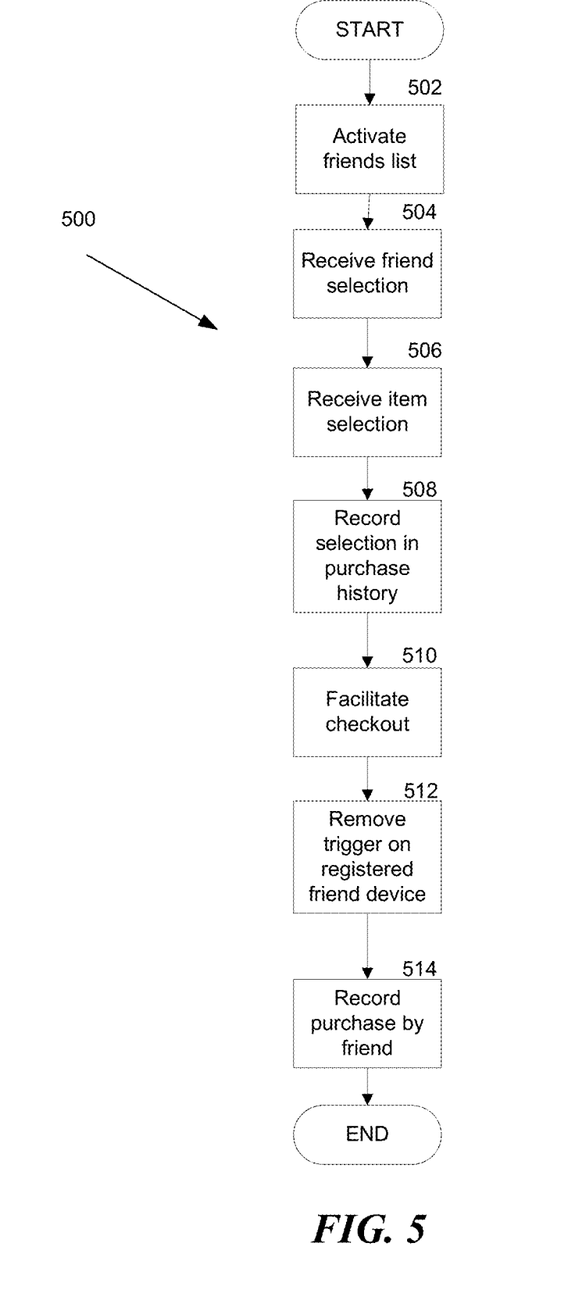
FIG. 5 is a flow chart illustrating third party integration with a location-aware device that has become flagged.

FIG. 5 is a flow chart illustrating third party integration with a location-aware device that has become flagged. In step 502, the client application GUI initiates a user's friends list. From the rendered friends list, a user may select a given friend. Alternatively, the user may enter a user account name into a search bar. In step 504, the GUI receives a selection of a friend, or a user other than the current active user.

In step 506, the GUI receives an item selection similarly to step 406 of FIG. 4. However, in step 506, the item selections are from one user device, for the benefit of removing the trigger from another device. In step 508, just as in step 408 the application software (either server or client) records the selections for use in future selections.

However in step 508, the application software records the selections for both the active mobile device, and for the user account identified in step 504.

In step 510, the client and server applications facilitate the processing of the payment for the selected items. In step 512, the server removes the trigger associated with the mobile device associated with the user account of the user identified in step 504. In step 514, the server records that a third person payment has been processed. With the third person payment both the payer and the beneficiary are recorded. In this manner, when the next payer is detected within the zone, the beneficiary is reminded of the previous third person payment and encouraged to similarly process a third person payment on behalf of the first payer.

In effect this creates a social payment system whereby users may buy things for one another. Each user is reminded of their friend's generosity and encouraged to act similarly. In the example of a coffee shop, this translates to friends, colleagues, romantic partners, and other associations purchasing one another coffee.

Figure 6:
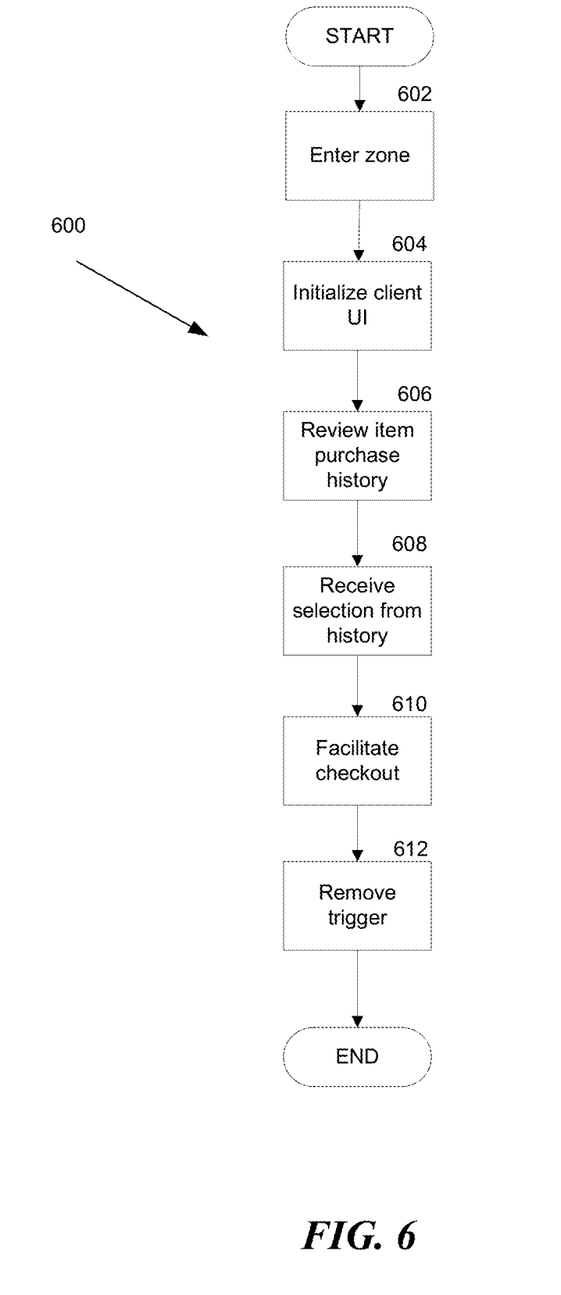
FIG. 6 is a flow chart illustrating learned item selection features.

FIG. 6 is a flow chart illustrating learned item selection features. This method is directed to processing a first person payment and the GUI involved where a recommended item is provided. In step 602, the mobile device is detected inside the zone. In step 604, the client application initializes a GUI. Step 604 occurs at any time (even when a mobile device is not inside the zone), but the client software prompts this step in conjunction with step 310 of FIG. 3.

In step 606, the application software reviews prior purchase history of the user and presents recommended items from that history to the user via the GUI on their respective mobile device. In step 608, the GUI receives selections from the rendered recommended purchase history list. The selected items form the basis of a processed payment.

In step 610, the client and server applications facilitate the processing of the payment for the selected items. In step 612, the server removes the trigger associated with the mobile device.

Figure 7:
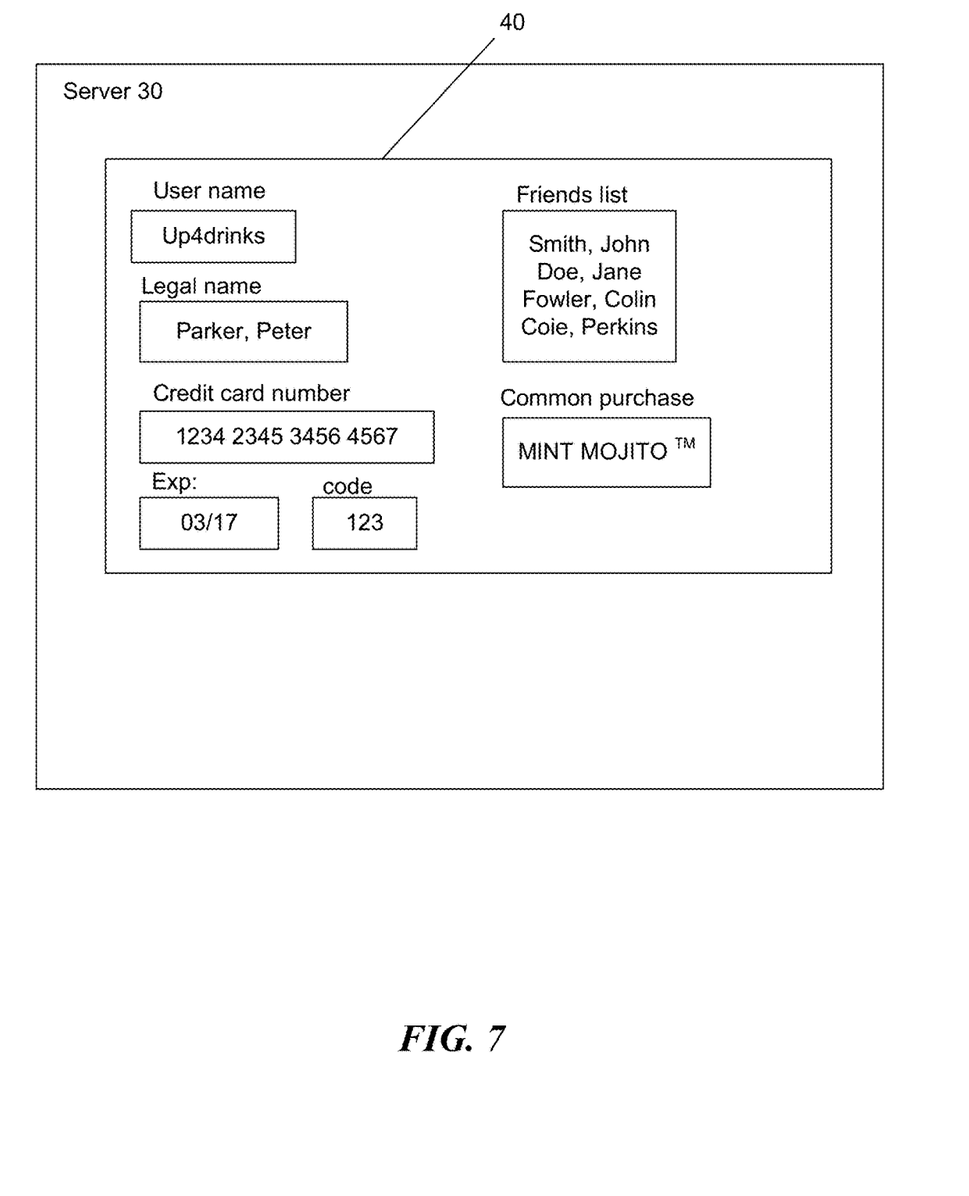
FIG. 7 is a block diagram of a user profile.

FIG. 7 is a diagram of a user profile 40. The user profile 40 is stored in the server 30. The user profile 40 includes details such as a user name, a legal name for the user, a payment card such as a credit card, along with necessary details for processing payment. In some embodiments, the user profile 40 further includes a friends list for third party payment processing and a common purchase history in order to provide purchase recommendations.

Figure 8:
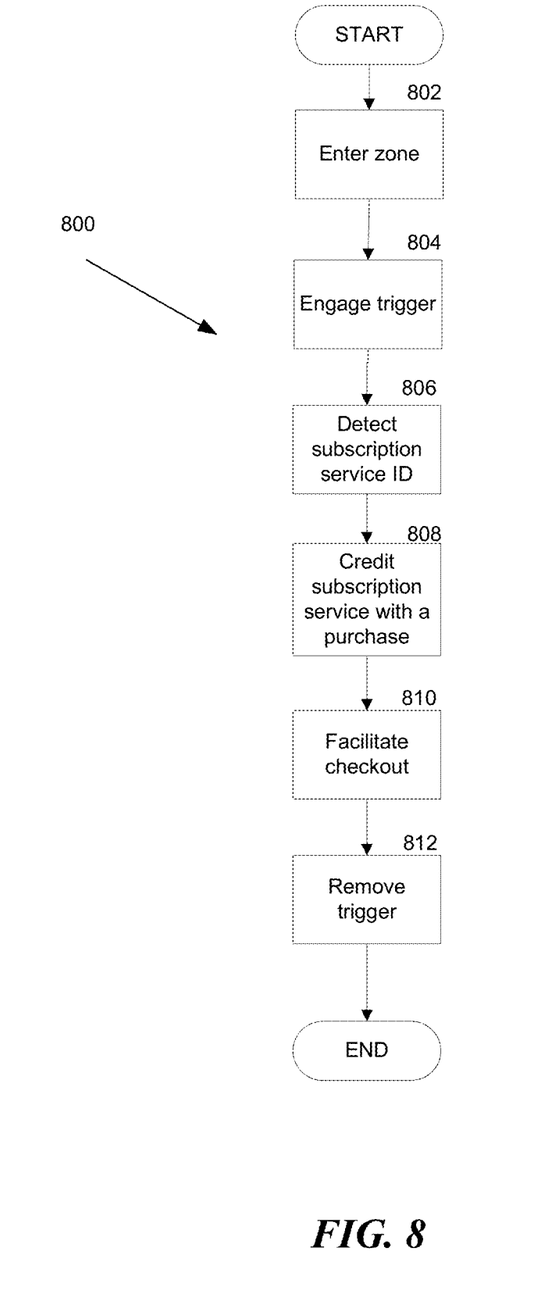
FIG. 8 is a flow chart illustrating a subscription charging service.

FIG. 8 is a flow chart illustrating a subscription charging service. In step 802, the mobile device is detected within the zone. In step 804, the web server engages the trigger on the mobile device. In step 806, the web server corresponds with the mobile device in the client application therein. The web server identifies that the mobile device and client application are associated with a subscription service. The subscription service provides faster checkout for users.

In step 808, the Web server credits the subscription with the purchase. There are a number of ways of operating a subscription service. In some embodiments, subscription service operates on a credit system where the user pays a certain monthly fee that obtains a corresponding number of credits. The user spends credits to remove the trigger from the device after entering the zone. The credits may be deducted automatically so user does not have to take any additional physical action. Where a user is out of credits, the method proceeds as if there were no subscription.

In some embodiments, the subscription service operates on an average purchase amount. When a given customer has established an average purchase price per visit, or average expenditures in a given month (e.g., through step 408 of FIG. 4) the subscription service credit the user account a visit and charges the user accordingly. Where the subscription is based on an average purchase price per visit, crediting the user account means automatically charging the user's credit card the average amount. Where the subscription is based on average expenditures in a given month, the user's credit card is charged once a month. However, crediting the user upon each visit to the zone may eventually change the average expenditure the given month, and this may change the monthly charge amount.

In some embodiments, the subscription service operates on a flat fee, all-you-can-consume model. In these embodiments, the user merely pays a monthly fee, and crediting the account upon entering the zone and activation of the trigger is used for analytical purposes.

In some embodiments, the user does not have to engage with the user interface of the client application at all. In this manner, the user does not have to remove their mobile device from a pocket or purse. In other embodiments, the user still engages with the user interface similarly to step 406 of FIG. 4. Receiving the selection of items in this manner is used for analytical purposes to keep track of inventory or modify subscription fees.

In step 810, the client and server applications facilitate the processing of the payment for the selected items. In step 812, the server removes the trigger associated with the mobile device.

An Example Machine Overview

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Figure 9:
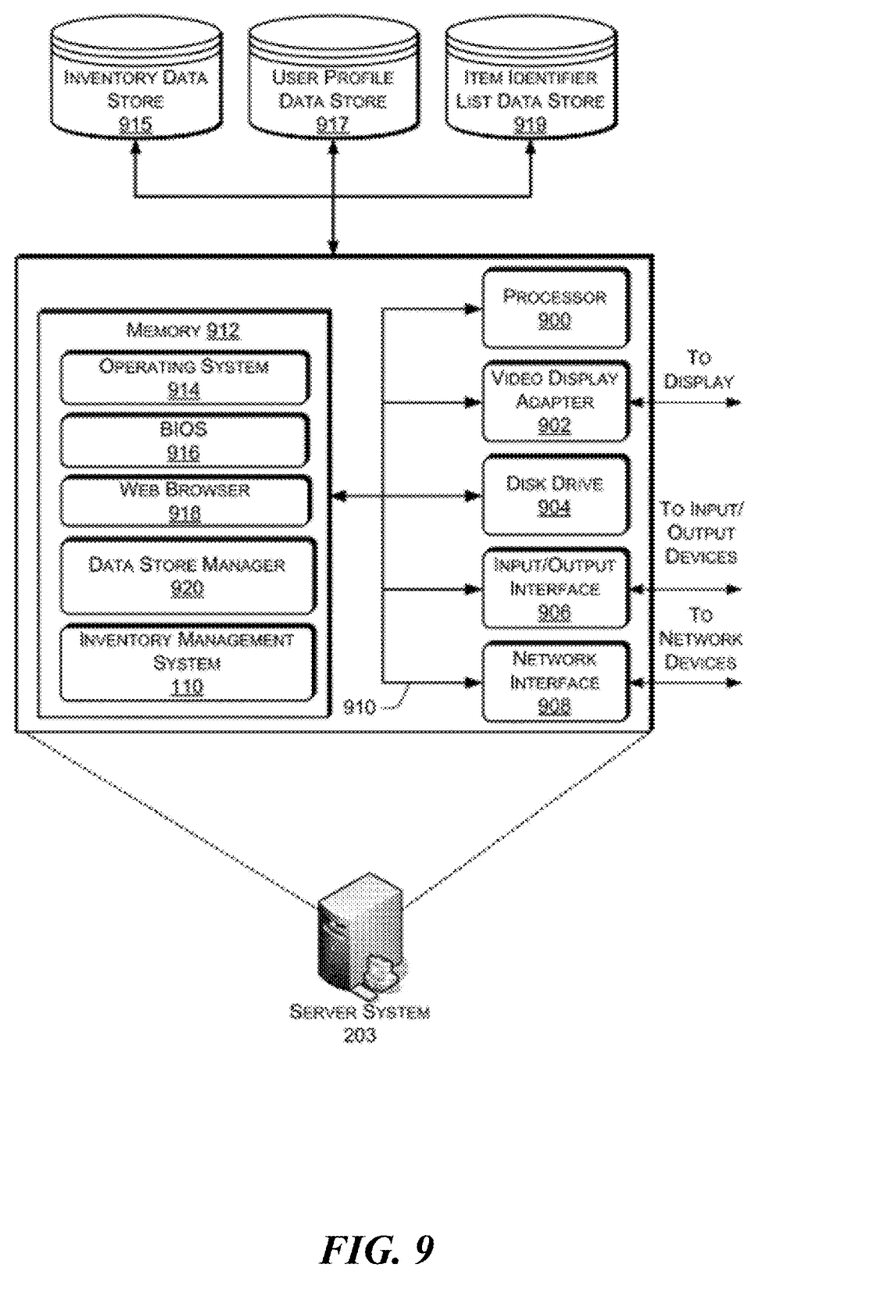
FIG. 9 is a pictorial diagram of an illustrative implementation of a server system, such as the remote computing resource, that may be used in the implementations described herein.

FIG. 9 is a pictorial diagram of an illustrative implementation of a server system, such as the remote computing resource, that may be used in the implementations described herein. The remote computing resource may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 203 to monitor and configure operation of the server system 203. The input/output interface 906 likewise communicates with external input/output devices not shown in FIG. 9, such as a mouse, keyboard, scanner, or other input and output devices that can be operated by an operator of the remote computing resource 203. The network interface 908 includes hardware, software, or any combination thereof, to communicate with other computing devices. For example, the network interface 908 may be configured to provide communications between the server system 203 and other computing devices via the network.

The memory 912 generally comprises random access memory (RAM), read-only memory (ROM), flash memory, and/or other volatile or permanent memory. The memory 912 is shown storing an operating system 914 for controlling the operation of the server system 203. A binary input/output system (BIOS) 916 for controlling the low-level operation of the server system 203 is also stored in the memory 912.

The memory 912 additionally stores program code and data for providing network services that allow an inventory management system to track items picked from inventory locations, placed into inventory locations and/or transitioned. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange between the inventory data store 915, the user data store 917 and/or the item identifier list data store 919.

As used herein, the term "data store" refers to any device or combination of devices capable of storing, accessing and retrieving data, which may include any combination and number of data servers, databases, data storage devices, and data storage media, in any standard, distributed or clustered environment. The remote computing resource can include any appropriate hardware and software for integrating with the data stores 915, 917, 919 as needed to execute aspects of the inventory management system.

The data stores 915, 917, 919 can include several separate data tables, databases or other data storage mechanisms and media for storing data relating to a particular aspect. For example, the data stores 915, 917, 919 illustrated include mechanisms for determining inventory information, user information, etc., which can be used to identify an item picked from an inventory location and/or placed into an inventory location. For example, the inventory data store 915 maintains information about inventory items. The information about inventory items may include the location of the inventory item in the materials handling facility, characteristics of the inventory item (e.g., size, shape, weight, dimensions, color, hazardous material, fragile), the price of the item, etc. The user data store 917 may maintain information about users. For example, a user profile may be established for each user that maintains information about the user. User information may include, but is not limited to, user identifying information (e.g., images of the user, height of the user, weight of the user) a user name and password, user biometrics, purchase history, payment instrument information (e.g., credit card, debit card, check card), purchase limits, and the like. The item identifier list data store 919 may include, for each user located in the materials handling facility, an item identifier list identifying each item picked by the user.

It should be understood that there can be many other aspects that may be stored in the data stores 915, 917, 919. The data stores 915, 917, 919 are operable, through logic associated therewith, to receive instructions from the remote computing resource and obtain, update, or otherwise process data in response thereto.

The memory 912 may also include the inventory management system, discussed above. The inventory management system may be executable by the processor 900 to implement one or more of the functions of the remote computing resource. In one implementation, the inventory management system may represent instructions embodied in one or more software programs stored in the memory 912. In another implementation, the inventory management system can represent hardware, software instructions, or a combination thereof.

The remote computing resource, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Figure 10:
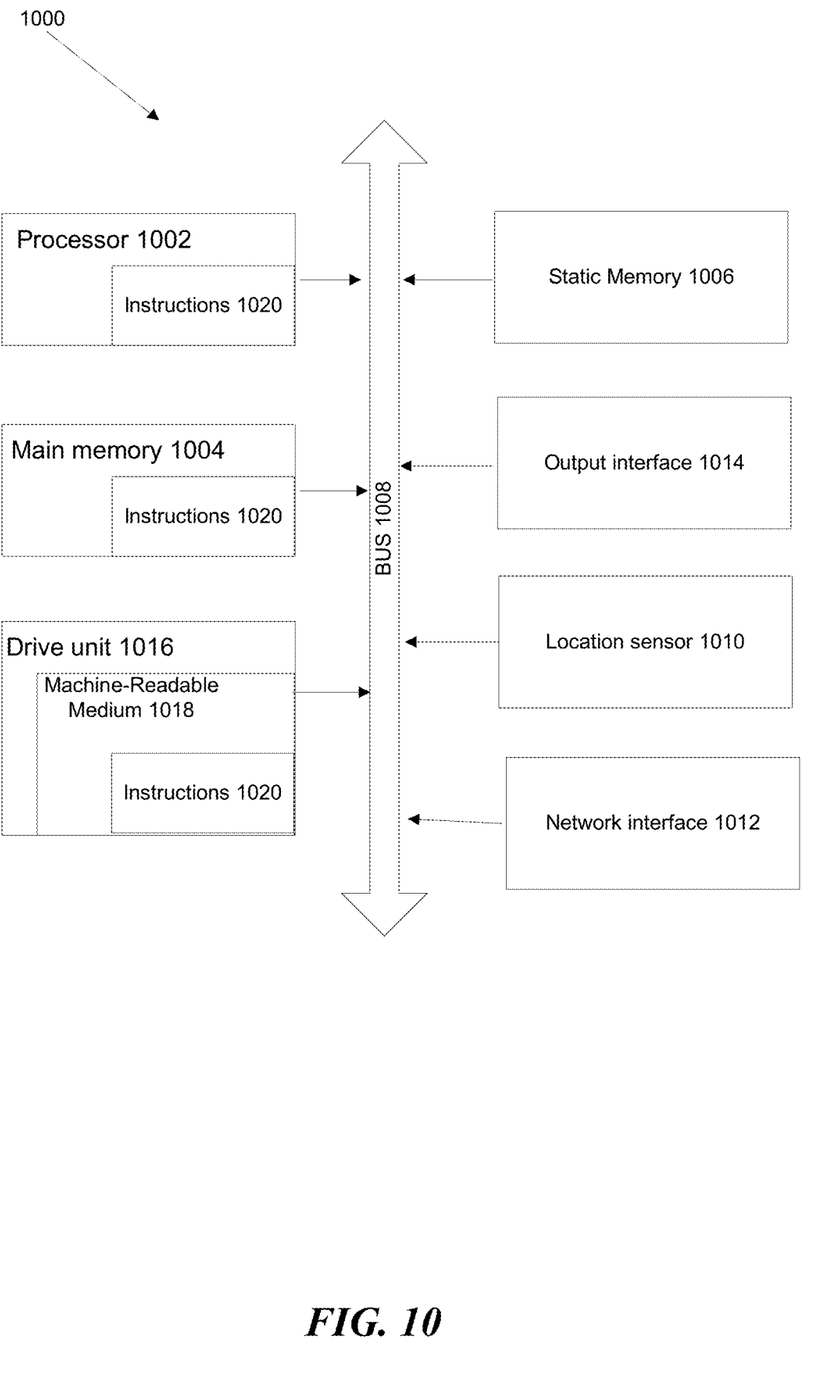
FIG. 10 is a block diagram of an exemplary computer system.

FIG. 10 is a block schematic diagram of a system in the exemplary form of a computer system 1000 within which a set of instructions for causing the system to perform any one of the foregoing methodologies and logical flows may be executed. In alternative embodiments.

The computer system 1000 includes a processor 1002, a main memory 1004 and a static memory 1006, which communicate with each other via a bus 1008. The computer system without further includes a location sensor 1010 and a network interface 1012. The computer system 1000 also includes an output interface 1014, for example, a USB interface, a network interface, or electrical signal connections and/or contacts;

The disk drive unit 1016 includes a machine-readable medium 1018 on which is stored a set of executable instructions, i.e. software 1020, embodying any one, or all, of the methodologies described herein. The software 1020 is also shown to reside, completely or at least partially, within the main memory 1004 and/or within the processor 1002. The software 1020 may further be transmitted or received over a network by means of a network interface device 1014.

In contrast to the system 1000 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

The invention claimed is:

1. A method comprising:
   determining, by a web server, that a first mobile device, of a first user, executing a first client application has entered a particular zone location within a business establishment as detected by location aware sensors in the first mobile device;
   initializing a countdown timer configured to determine a time period that the first user is within the particular zone, by the web server, the countdown timer having a predetermined duration;
   engaging a trigger, by the web server, that identifies the first client application as being active to the web server in response to determining that the countdown timer duration has expired and that none of the following three triggering events have occurred prior to the countdown tinier expiring:
   (i) the web server processes a first person payment from the first client application via the first mobile device;
   (ii) the web server processes a third person payment from a second client application executing on a second mobile device on behalf of the first client application; or
   (iii) the web server detects the first mobile device has exited the particular zone;
   in response to said engaging the trigger, transmitting, by the web server, a notification to the first mobile device executing the first client application, the notification soliciting payment from the first client application; and
   while the trigger is engaged, determining, by the web server, that one of the following three payment events has occurred:
   (i) that the first mobile device has exited the particular zone;
   (ii) that a first person payment from the first client application via the first mobile device has been processed; or
   (iii) that a third person payment from a second client application executing on a second mobile device on behalf of the first client application has been processed;
   in response to determining that payment event (i) has occurred, charging the first user a predetermined fee and disengaging, by the web server, the trigger; and
   in response to determining that payment event (ii) or (iii) has occurred, disengaging, by the web server, the trigger.

2. The method of claim 1, wherein payment event (ii) further comprises:
   receiving, by the first client application, user input including a list of goods for which payment is due, the list of goods including goods available in the particular zone, and an amount of the of the first person payment based on the list of goods.

3. The method of claim 2, further comprising:
   storing, by the web server, a list of suggested goods based on goods found on the list of goods over a plurality of iterations of the list of goods.

4. The method of claim 2, further comprising:
   rendering, by a graphic user interface, the list of suggested goods on the first mobile device;
   receiving, by the graphic user interface, user input of a selection of a member of the list of suggested goods; and
   adding, by the web server, the member of the list of suggested goods to the list of goods.

5. The method of claim 1, wherein processing payment event (iii) further comprises:
   receiving, by the second client application, user input including a list of goods for which payment is due, the list of goods including goods available in the particular zone, and an amount of the of the third person payment based on the list of goods.

6. The method of claim 1, further comprising:
   storing, by the web server, a friends list associated with the second client application, the friends list including identifying data for the first client application.

7. The method of claim 6, further comprising:
   receiving, by the second client application, user input including a selection of the first client application while the first user device is within the particular zone, the user input notifies the web server to facilitate the third person payment from the second client application executing on the second mobile device for the first client application.

8. The method of claim 1, further comprising:
   transmitting, by the web server, a reminder notification to the first user device, the reminder notification includes data identifying a previous third person payment and invites the first user to authorize a payback payment from the first client application executing on the first mobile device on behalf of the second client application.

9. The method of claim 1, wherein said detection by location aware sensors is performed including any of:
- transmitting, by the first client application, a GPS location to the web server wherein the GPS location is within the particular zone;
- connecting, by a local wireless network, to the first user device, where the local wireless network is located at the particular zone and is communication with the web server; or
- initiating communications, by a wireless door gate, to the first user device, where the wireless door gate is positioned at an entry way for the particular zone and is wirelessly communicating via any of Bluetooth, Bluetooth low energy, near-field communication, or RFID.

10. The method of claim 1, wherein payment events (i) or (ii) further comprise:
- detecting, by the web server, that the first client application is associated with a subscription service; and
- crediting, by the web server, the first person payment to the subscription service associated with the first client application.

11. A system comprising:
- a first client application executed on a first mobile device owned by a first user, the first client application including a user interface configured to enable the first user to select and pay for items available at a particular zone location within a business establishment; and
- a web server including instructions that when executed cause the web server to:
  - determine that the first mobile device has entered the particular zone as detected by location aware sensors in the first mobile device;
  - initialize a countdown timer configured to determine a time period that the first user is within the particular zone, the countdown timer having a predetermined duration;
  - engage a trigger that identifies the first client application as being active to the web server in response to determining that the countdown timer duration has expired and that none of the following three triggering events have occurred prior to the countdown timer expiring:
    - (i) the web server processes a first person payment from the first client application via the first mobile device;
    - (ii) the web server processes a third person payment from a second client application executing on a second mobile device on behalf of the first client application:
    - (iii) the web server detects the first mobile device has exited the particular zone:
  - in response to said engaging the trigger, transmit a notification to the first mobile device executing the first client application, the notification soliciting payment from the first client application; and
  - while the trigger is engaged, determine that one of the following three payment events has occurred:
    - (i) that the first mobile device has exited the particular zone;
    - (ii) that a first person payment from the first client application via the first mobile device has been processed; or
    - (iii) that a third person payment from a second client application executing on a second mobile device on behalf of the first client application has been processed;
  - in response to determining that payment event (i) has occurred, charge the first user a predetermined fee and disengage the trigger; and
  - in response to determining that payment event (ii) or (iii) has occurred, disengage the trigger.

12. The system of claim 11, further comprising at least one of:
- a GPS location sensor on the first mobile device in communication with the web server wherein the web server is notified when the first mobile device is within the particular zone;
- a wireless access point supporting a local wireless network, the wireless access point located at and having wireless communication range over the particular zone and in communication with the web server, wherein the web server is notified when the first mobile device connects to the wireless access point; or
- a wireless door gate positioned at an entry way for the particular zone and wirelessly communicates with the first mobile device via any of Bluetooth, Bluetooth low energy, near-field communication, or RFID, wherein the web server is notified when the first mobile device communicates with the wireless door gate.

13. The system of claim 11, wherein processing payment event (ii) includes the first client application receiving user input including a list of goods for which payment is due, the list of goods including goods available in the particular zone, and an amount of the of the first person payment based on the list of goods.

14. The system of claim 13, wherein the web server is further configured to
- store a list of suggested goods based on goods found on the list of goods over a plurality of iterations of the list of goods.

15. The system of claim 14, further comprising:
- a graphic user interface configured to render the list of suggested goods on the first mobile device and receive user input of a selection of a member of the list of suggested goods; and
- wherein the web server is further configured to add the member of the list of suggested goods to the list of goods.

16. The system of claim 11, wherein payment event (iii) further comprises:
- receiving, by the second client application, user input including a list of goods for which payment is due, the list of goods including goods available in the particular zone, and an amount of the of the third person payment based on the list of goods.

17. The system of claim 11, wherein the web server is further configured to
- store a friends list associated with the second client application, the friends list including identifying data for the first client application.

18. The system of claim 17, wherein the second client application is further configured to receive a selection of the first client application while the first mobile device is within the particular zone, the user input notifies the web server to facilitate the third person payment from the second client application executing on the second mobile device on behalf of the first client application.

19. The system of claim 11, wherein the web server is further configured to transmit a reminder notification to the first user device, the reminder notification includes data identifying a previous third person payment and invites the first user to authorize a payback payment from the first client application executing on the first mobile device on behalf of the second mobile application.

\* \* \* \* \*